United States Patent
Sun et al.

(10) Patent No.: US 10,577,770 B2
(45) Date of Patent: Mar. 3, 2020

(54) SELF-STARTING NEGATIVE PRESSURE DRAINAGE SYSTEM FOR DRAINING GROUNDWATER IN SLOPE AND CONSTRUCTION METHOD THEREOF

(71) Applicant: ZHEJIANG UNIVERSITY, Hangzhou, Zhejiang (CN)

(72) Inventors: Hongyue Sun, Zhejiang (CN); Yuequan Shang, Zhejiang (CN); Yunhe Fan, Zhejiang (CN); Huan Xu, Zhejiang (CN); Feixiang Shuai, Zhejiang (CN); Dongfei Wang, Zhejiang (CN); Chengcheng Lv, Zhejiang (CN)

(73) Assignee: ZHEJIANG UNIVERSITY, Hangzhou, Zhejiang (CN)

(*) Notice: Subject to any disclaimer, the term of this patent is extended or adjusted under 35 U.S.C. 154(b) by 0 days.

(21) Appl. No.: 16/300,957

(22) PCT Filed: Nov. 6, 2017

(86) PCT No.: PCT/CN2017/109459
§ 371 (c)(1),
(2) Date: Nov. 13, 2018

(87) PCT Pub. No.: WO2019/000776
PCT Pub. Date: Mar. 1, 2019

(65) Prior Publication Data
US 2019/0153698 A1    May 23, 2019

(30) Foreign Application Priority Data

Jun. 30, 2017 (CN) .......................... 2017 1 0522908

(51) Int. Cl.
*E02D 17/20* (2006.01)
*E02D 3/10* (2006.01)
*E02D 5/74* (2006.01)

(52) U.S. Cl.
CPC ............... *E02D 17/20* (2013.01); *E02D 3/10* (2013.01); *E02D 5/74* (2013.01)

(58) Field of Classification Search
CPC ............. E02D 17/20; E02D 3/10; E02D 5/80
(Continued)

(56) References Cited

U.S. PATENT DOCUMENTS

| 3,902,322 | A | * | 9/1975 | Watanabe | ............... E02B 11/00 173/33 |
| 3,902,323 | A | * | 9/1975 | Watanabe | ............. E02B 11/005 166/227 |
| 2008/0080931 | A1 | * | 4/2008 | Melegari | ................... E02D 3/10 405/43 |

FOREIGN PATENT DOCUMENTS

| CN | 102155016 A | * | 8/2011 | ............. E02D 17/20 |
| CN | 103437354 |   | * 12/2013 | |

(Continued)

*Primary Examiner* — Frederick L Lagman

(57) ABSTRACT

A self-starting negative pressure drainage system for draining groundwater in a slope, includes: a declined borehole, a pipe boot, a permeable pipe and a drain pipe; wherein the declined borehole is divided into a permeable drilling section and a sealed grouting drilling section; wherein the permeable drilling section is on a lower portion of the declined borehole, and the sealed grouting drilling section is on an upper portion of the declined borehole; a water stop ring made of water-expanding rubber is provided between the permeable drilling section and the sealed grouting drilling section; the permeable drilling section comprises the permeable pipe; a top of the permeable pipe contacts the water-expanding rubber; a cavity is formed in the permeable pipe, an inlet of the drain pipe passes through the water stop (Continued)

ring made of water-expanding rubber and is inserted into the permeable pipe.

5 Claims, 1 Drawing Sheet

(58) Field of Classification Search
    USPC .......................................... 405/302.4, 302.6
    See application file for complete search history.

(56) References Cited

FOREIGN PATENT DOCUMENTS

| | | | | |
|---|---|---|---|---|
| CN | 104727319 | * | 6/2015 | |
| CN | 104878760 A | * | 9/2015 | |
| CN | 106049414 A | * | 10/2016 | |
| CN | 206667264 U | * | 11/2017 | |
| CN | 107489438 A | * | 12/2017 | |
| CN | 108755708 A | * | 11/2018 | |
| CN | 208105292 U | * | 11/2018 | |
| JP | 58054131 A | * | 3/1983 | ............. E02D 17/20 |
| JP | 60040427 A | * | 3/1985 | ............. E02D 17/20 |
| JP | 2001152459 A | * | 6/2001 | |
| JP | 2007170115 A | * | 7/2007 | |
| JP | 6262814 B1 | * | 1/2018 | |
| JP | 2018021383 A | * | 2/2018 | |
| KR | 1874464 B1 | * | 7/2018 | |
| WO | WO-2019000775 A1 | * | 1/2019 | |

* cited by examiner

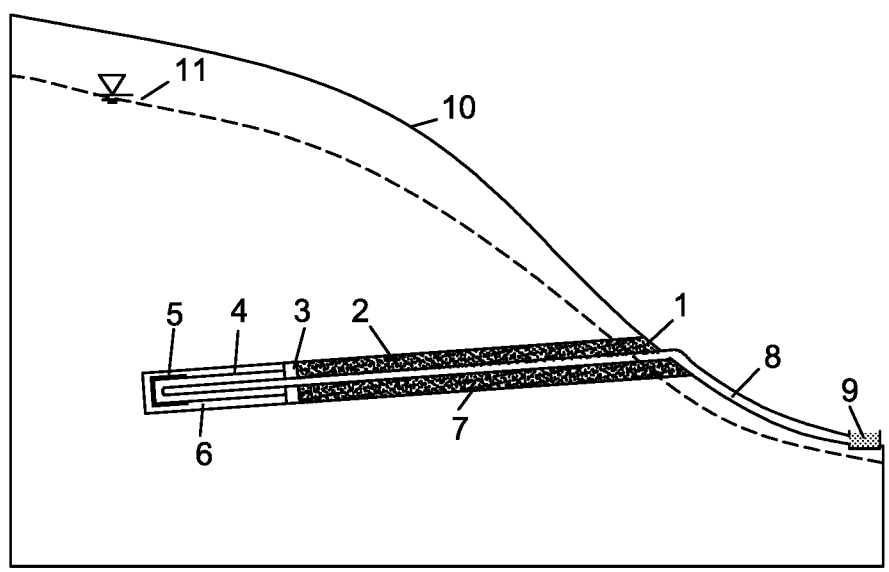

SELF-STARTING NEGATIVE PRESSURE DRAINAGE SYSTEM FOR DRAINING GROUNDWATER IN SLOPE AND CONSTRUCTION METHOD THEREOF

CROSS REFERENCE OF RELATED APPLICATION

This is a U.S. National Stage under 35 U.S.C. 371 of the International Application PCT/CN2017/109459, filed Nov. 6, 2017, which claims priority under 35 U.S.C. 119(a-d) to CN 201710522908.2, filed Jun. 30, 2017.

BACKGROUND OF THE PRESENT INVENTION

Field of Invention

The present invention relates to the technical field of landslide disaster, and more particularly to a system and method for discharging slope groundwater. The present invention is suitable for controlling rising range of groundwater in a slope, and is particularly suitable for side slope drainage in which slope deformation is mainly affected by changes of the groundwater level.

Description of Related Arts

A large number of landslides are induced by elevation of the groundwater level of the slope caused by rainfall infiltration. The elevation of groundwater level of the slope is a process of accumulating rainfall infiltration. Taking continuous and effective drainage measures and discharging the groundwater infiltrated into the slope in real time is capable of reducing the occurrence of a large number of landslide disasters.

The main drainage measures for the conventional side slope comprise surface drainage ditch and blind drainage ditch, pumping collecting well, horizontal drainage holes, underground drainage holes, and etc. Surface drainage measures such as the surface drainage ditch and blind drainage ditch are difficult to ensure the effectiveness of drainage thereof. Pumping wells require power and regular management, high energy consumption and high cost of utilization. Due to the small inclination of the horizontal drainage holes, blockage is easy to occur during the process of natural drainage, affecting the long-term effectiveness of drainage measures. The underground drainage holes have a long construction period, a complicated process and high cost. So far, there is a lack of methods for sucking and draining groundwater of the slope, and exploring new technologies for effective slope drainage with high economic efficiency is still a top priority.

SUMMARY OF THE PRESENT INVENTION

In view of the shortcomings in the conventional slope drainage technique, an object of the present invention is to provide a continuous and effective self-starting negative pressure drainage system for draining groundwater in slope and construction method thereof, so as to solve the problem of landslide disaster caused by excessive rise of groundwater level in the slope. The system of the present invention not only is capable of efficiently discharging groundwater deep in the slope in real time, but also does not require frequent post-maintenance.

Accordingly, in order to achieve the objects mentioned above, a technical solution provided by the present invention is as follows.

A self-starting negative pressure drainage system for draining groundwater in slope, comprises: a declined borehole, a pipe boot, a permeable pipe and a drain pipe; wherein the declined borehole is divided into a permeable drilling section and a sealed grouting drilling section; wherein the permeable drilling section is on a lower portion of the declined borehole, and the sealed grouting drilling section is on an upper portion of the declined borehole; a water stop ring made of water-expanding rubber is provided between the permeable drilling section and the sealed grouting drilling section; the permeable drilling section comprises the permeable pipe and the pipe boot provided on a bottom of the permeable pipe; a top of the permeable pipe contacts the water-expanding rubber; a cavity is formed in the permeable pipe, large particles such as coarse sand, macadam and etc. are prevented from entering the cavity, and groundwater is capable of penetrating into the cavity via the permeable pipe; an inlet of the drain pipe passes through the water stop ring made of water-expanding rubber and is inserted into the permeable pipe, an outlet of the drain pipe is provided on a low portion of the slope, and a height of the outlet is lower than a bottom hole height of the borehole; a gap between the drain pipe and the drilling wall of the sealed grouting drilling section is filled with the cement mortar; drainage capacity of the drain pipe. i.e., a maximum flow rate is greater than a flow rate of the groundwater of the slope permeated into the permeable drilling section.

Preferably, a diameter of the borehole is greater than 90 mm.

Preferably, the permeable pipe adopts outer woven filter cloth and perforated corrugated pipes made of HDPE as an inner support; the pipe boot adopts an HDPE pipe with a sealed bottom and an open top; wherein the drain pipe adopts a PA pipe with a diameter at a range of 4-8 mm.

A self-starting negative pressure drainage method for draining groundwater in slope, comprises steps of:

(1) investigating geological conditions of a slope engineering; analyzing a buried depth of groundwater and a groundwater level to be controlled, and punching a borehole for drainage which is declined to enter a position below the safe groundwater level of the slope;

(2) taking a length of a permeable pipe as a length of a permeable drilling section; inserting a bottom of the permeable pipe into a pipe boot for fixing; setting a water stop ring made of water-expanding rubber on a top of the permeable pipe; wherein an inlet of the drain pipe passes through the stop ring made of water-expanding rubber and is inserted in the permeable pipe;

(3) inserting the pipe boot, the permeable pipe, the water stop ring made of water-expanding rubber and the drain pipe together into the permeable drilling section; setting an outlet of the drain pipe below the slope; and wherein a height of the outlet is less than a height of a bottom of the borehole;

(4) after the water stop ring made of water-expanding rubber is fully expanded, filling cement mortar in a gap between the drain pipe and borehole wall of the sealed grouting drilling section;

(5) when a height of water head of the inlet of the drain pipe is greater than a height of an aperture of the borehole which is caused by elevation of the groundwater of the slope, discharging groundwater in the permeable drilling section by the drain pipe under an effect of a head difference, in such a manner that drainage process occurs; wherein since the drainage capacity of the drain pipe is greater than a infiltration flow rate of the groundwater of the permeable drilling section, a siphon effect during a drainage process causes a negative pressure in the cavity to accelerate a flow of groundwater in the slope into the cavity; when the groundwater in the slope body and the cavity is drained off, air enters the inlet of the drain pipe, suction and discharge action of the drain pipe disappears, and a first drainage process is terminated; a drainage process circulates with the circulation of the rainfall infiltration.

The beneficial effects of the present invention are mainly manifested in following aspects.

1. The present invention is capable of realizing real-time continuous drainage of a deep portion of slopes, solving the problem of drainage treatment of large landslides, and ensuring that the construction cost of maintaining slope stability is low;

2. The treatment process does not involve large-scale earthwork excavation, and the implementation process of the treatment project is simple and easy;

3. The drainage measures have good reliability and strong applicability, and the drainage process requires no power and regular management and maintenance;

4. Each drainage hole can be constructed and operated independently, which is convenient for implementation of different parts of the slope. It is easy to construct and select points. Various parts can be constructed at the same time, and the drainage system is constructed at a high speed;

5. During the drainage process, the siphon action creates a negative pressure in the permeable drilling section, forcing the groundwater in the slope to flow rapidly to the borehole and be discharged out of the surface;

6. Intermittent suction and drainage is capable of taking out fine soil particles in the borehole to prevent siltation in the hole.

These and other objectives, features, and advantages of the present invention will become apparent from the following detailed description, the accompanying drawings, and the appended claims.

BRIEF DESCRIPTION OF THE DRAWINGS

The FIGURE is a structural schematic view of a negative pressure self-starting drainage system and method for draining groundwater in a slope according to a preferred embodiment of the present invention.

References in the Figure: 1—borehole; 2—cement mortar; 3—water stop ring made of water-expanding rubber; 4—permeable pipe; 5—pipe boot; 6—permeable drilling section; 7—sealed grouting drilling section; 8—drain pipe; 9—outlet; 10—slope; 11—groundwater level.

DETAILED DESCRIPTION OF THE PREFERRED EMBODIMENT

Further description of the present invention will be illustrated in detail combining with the preferred embodiments.

The invention is further illustrated below in conjunction with specific embodiments. It is to be understood that the examples are merely illustrative of the invention and are not intended to limit the scope of the invention. In addition, it is to be understood that various modifications and changes may be made to the present invention, and the equivalents of the scope of the invention.

Embodiment 1

As shown in FIG. 1, the preferred embodiment provides a negative pressure self-starting drainage system and method for draining groundwater in a slope, comprising: a declined borehole 1, a pipe boot 5, a permeable pipe 4 and a drain pipe 8; wherein the declined borehole 1 is divided into a permeable drilling section 6 and a sealed grouting drilling section 7; wherein the permeable drilling section 6 is on a lower portion of the declined borehole 1, the sealed grouting drilling section 7 is on an upper portion of the declined borehole 1; a water stop ring made of water-expanding rubber 3 is provided between the permeable drilling section 6 and the sealed grouting drilling section 7; the permeable drilling section 6 comprises the permeable pipe 4 and the pipe boot 5; a top of the permeable pipe 4 contacts the water-expanding rubber 3; a cavity is formed in the permeable pipe 4, large particles of coarse sand and macadam are prevented from entering the cavity, and groundwater is capable of penetrating into the cavity via the permeable pipe 4; an inlet of the drain pipe 8 passes through the water stop ring 3 made of water-expanding rubber and is inserted into the permeable pipe 4, an outlet 9 of the drain pipe 8 is provided on a low portion of the slope, and a height of the outlet 9 is lower than a bottom hole height of the borehole 1; a gap between the drain pipe 8 and the drilling wall of the sealed grouting drilling section 7 is filled with the cement mortar 2, so as to block water-gas communication between an earth surface and the cavity of the permeable drilling section 6; the water stop ring 3 made of water-expanding rubber is configured to ensure that the cement mortar 2 of the sealed grouting drilling section 7 is prevented from entering the cavity of the permeable drilling section 6 during a grouting process; drainage capacity of the drain pipe 8. i.e., a maximum flow rate $q_2$, should be greater than a flow rate $q_1$ of the groundwater of the slope 10, in such a manner that a negative pressure is formed in the cavity, so as to pump groundwater around the borehole to achieve efficient drainage; wherein $q_1$ can be estimated according to formula (1), and $q_2$ can be estimated according to formula (2).

$$q_1 = 1.366 \frac{K_0(H_0^2 - h_\omega^2)}{lg(R/r_\omega)}; \quad (1)$$

wherein $K_0$ is a permeability coefficient of rock-soil body, $H_0$ is a length of the permeable drilling section, $h_\omega$ is a length of the drilling section below water surface in the borehole after drainage, $R$ is a radius of influence, $r_\omega$ is a radius of drainage borehole.

$$q_2 = 0.25\pi d^2 v \sqrt{\frac{2g\Delta h}{1 + \zeta + \lambda L/d}}; \quad (2)$$

wherein $\Delta h$ is a head difference between the inlet and the outlet, $\zeta$ is a coefficient of local resistance of the drain pipe; $\lambda$ is a frictional resistant coefficient of the drain pipe, $L$ and $d$ are respectively pipe length and internal diameter of the drain pipe.

A length of the sealed grouting drilling section 7 should satisfy a result that the water stop ring 3 made of water-expanding rubber is below the groundwater level 11 of the slope. Meanwhile, the length of the sealed grouting drilling section 7 is determined according to permeability coefficient of the rock-soil body. When the permeability coefficient of the rock-soil body is greater than 1 m/d, the length of the sealed grouting drilling section 7 is greater than 10 m; when the permeability coefficient of the rock-soil body is at a range of 1 m/d~$10^{-1}$ m/d, the length of the sealed grouting drilling section 7 is at a range of 6-10 m; when the permeability coefficient of the rock-soil body is at a range of $10^{-1}$ m/d~$10^{-2}$ m/d, the length of the sealed grouting drilling section 7 is at a range of 3-6 m; when the permeability coefficient of the rock-soil body is less than $10^{-2}$ m/d, the length of the sealed grouting drilling section 7 is greater than 3 m.

In addition, a diameter of the borehole 1 should be greater than 90 mm. The permeable pipe 4 can adopt outer woven filter cloth and perforated corrugated pipes made of HDPE as inner support. The pipe boot 5 can adopt HDPE pipe with a sealed bottom and an open top. The drain pipe 8 can adopt a PA pipe with a diameter at a range of 4-8 mm. The drain pipe 8 has good gas-tightness, and is utilized for naturally starting draining when height of water head in the cavity is greater than a height of an aperture of the borehole which is caused by elevation of groundwater of the slope, so as to discharge groundwater in the slope in real time to control the groundwater below a safe water level.

The present invention further provides a method utilizing the negative pressure self-starting drainage system for draining groundwater in a slope, comprising steps of:

(1) investigating geological conditions of a slope engineering; analyzing a buried depth of groundwater and a groundwater level 11 to be controlled, and punching a borehole 1 for drainage which is declined to enter a position below the safe groundwater level 11 of the slope; wherein the borehole 1 can be provided on different positions on a surface of the slope, and the positions are determined according to factors comprising types of a rock-soil body, a slope gradient, rainfall characteristics of a slope area and a construction method;

(2) taking a length of a permeable pipe 4 as a length of a permeable drilling section 6; inserting a bottom of the permeable pipe 4 into a pipe boot 5 for fixing; setting a water stop ring 3 made of water-expanding rubber on a top of the permeable pipe 4; wherein an inlet of the drain pipe 8 passes through the stop ring 3 made of water-expanding rubber and is inserted in the permeable pipe 4;

(3) inserting the pipe boot 5, the permeable pipe 4, the water stop ring 3 made of water-expanding rubber and the drain pipe 8 together into the permeable drilling section 6; setting an outlet 9 of the drain pipe 8 below the slope; and wherein a height of the outlet 9 is less than a height of a bottom of the borehole 1;

(4) after the water stop ring 3 made of water-expanding rubber is fully expanded, filling cement mortar 2 in a gap between the drain pipe 8 and borehole wall of the sealed grouting drilling section 7;

(5) when a height of water head of the inlet of the drain pipe is greater than a height of an aperture of the borehole 1 which is caused by elevation of the groundwater of the slope, discharging groundwater in the permeable drilling section 6 by the drain pipe 8 under an effect of a head difference, in such a manner that drainage process occurs; wherein since the drainage capacity of the drain pipe 8 is greater than a infiltration flow rate of the groundwater of the permeable drilling section 6, a siphon effect during a drainage process causes a negative pressure in the cavity to accelerate a flow of groundwater in the slope into the cavity; when the groundwater in the slope body and the cavity is drained off, air enters the inlet of the drain pipe 8, suction and discharge action of the drain pipe 8 disappears, and a first drainage process is terminated; a drainage process circulates with the circulation of the rainfall infiltration.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A self-starting negative pressure drainage system for draining groundwater in the slope, comprising: a declined borehole, a pipe boot, a permeable pipe and a drain pipe; wherein the declined borehole is divided into a permeable drilling section and a sealed grouting drilling section; wherein the permeable drilling section is on a lower portion of the declined borehole, and the sealed grouting drilling section is on an upper portion of the declined borehole; a water stop ring made of water-expanding rubber is provided between the permeable drilling section and the sealed grouting drilling section; the permeable drilling section comprises the permeable pipe and the pipe boot provided on a bottom of the permeable pipe; a top of the permeable pipe contacts the water-expanding rubber; a cavity is formed in the permeable pipe, groundwater is capable of penetrating into the cavity via the permeable pipe; an inlet of the drain pipe passes through the water stop ring made of water-expanding rubber and is inserted into the permeable pipe, an outlet of the drain pipe is provided on a low portion of the slope, and a height of the outlet is lower than a bottom hole height of the borehole; a gap between the drain pipe and the drilling wall of the sealed grouting drilling section is filled with the cement mortar; drainage capacity of the drain pipe, a maximum flow rate is greater than a flow rate of the groundwater of the slope permeated into the permeable drilling section.

2. The self-starting negative pressure drainage system for draining groundwater in the slope, as recited in claim 1, wherein a diameter of the borehole is greater than 90 mm.

3. The self-starting negative pressure drainage system for draining groundwater in the slope, as recited in claim 1, wherein the permeable pipe comprises outer woven filter cloth and perforated corrugated pipes made of HDPE (high-density polyethylene) as an inner support; the pipe boot adopts an HDPE pipe with a sealed bottom and an open top; wherein the drain pipe adopts a PA (polyamide) pipe with a diameter at a range of 4-8 mm.

4. A self-starting negative pressure drainage method for draining groundwater in the slope using the system as recited in claim 1, comprising steps of:

(1) investigating geological conditions of a slope engineering; analyzing a buried depth of groundwater and a groundwater level to be controlled, and punching a borehole for drainage which is declined to enter a position below the safe groundwater level of the slope;

(2) taking a length of a permeable pipe as a length of a permeable drilling section; inserting a bottom of the permeable pipe into a pipe boot for fixing; setting a water stop ring made of water-expanding rubber on a top of the permeable pipe; wherein an inlet of the drain pipe passes through the stop ring made of water-expanding rubber and is inserted in the permeable pipe;

(3) inserting the pipe boot, the permeable pipe, the water stop ring made of water-expanding rubber and the drain pipe together into the permeable drilling section; setting an outlet of the drain pipe below the slope; and wherein a height of the outlet is less than a height of a bottom of the borehole;

(4) after the water stop ring made of water-expanding rubber is fully expanded, filling cement mortar in a gap between the drain pipe and borehole wall of the sealed grouting drilling section;

(5) when a height of water head of the inlet of the drain pipe is greater than a height of an aperture of the borehole which is caused by elevation of the groundwater of the slope, discharging groundwater in the permeable drilling section by the drain pipe under an effect of a head difference, in such a manner that drainage process occurs; wherein since the drainage capacity of the drain pipe is greater than a infiltration flow rate of the groundwater of the permeable drilling section, a siphon effect during a drainage process causes a negative pressure in the cavity to accelerate a flow of groundwater in the slope into the cavity; when the groundwater in the slope body and the cavity is drained off, air enters the inlet of the drain pipe, suction and discharge action of the drain pipe disappears, and a first drainage process is terminated; a drainage process circulates with the circulation of the rainfall infiltration.

5. A self-starting negative pressure drainage method for draining groundwater in the slope using the system as recited in claim 2, comprising steps of:

(1) investigating geological conditions of a slope engineering; analyzing a buried depth of groundwater and a groundwater level to be controlled, and punching a borehole for drainage which is declined to enter a position below the safe groundwater level of the slope;

(2) taking a length of a permeable pipe as a length of a permeable drilling section; inserting a bottom of the permeable pipe into a pipe boot for fixing; setting a water stop ring made of water-expanding rubber on a top of the permeable pipe; wherein an inlet of the drain pipe passes through the stop ring made of water-expanding rubber and is inserted in the permeable pipe;

(3) inserting the pipe boot, the permeable pipe, the water stop ring made of water-expanding rubber and the drain pipe together into the permeable drilling section; setting an outlet of the drain pipe on a low portion out of the slope; and wherein a height of the outlet is less than a height of a bottom of the borehole;

(4) after the water stop ring made of water-expanding rubber is fully expanded, filling cement mortar in a gap between the drain pipe and borehole wall of the sealed grouting drilling section;

(5) when a height of water head of the inlet of the drain pipe is greater than a altitude of the borehole orifice which is caused by the rising of groundwater in a slope, discharging groundwater in the permeable drilling section by the drain pipe under an effect of a head difference, in such a manner that drainage process occurs; wherein since the drainage capacity of the drain pipe is greater than a infiltration flow rate of the groundwater of the permeable drilling section, a siphon effect during a drainage process causes a negative pressure in the cavity to accelerate a flow of groundwater in the slope into the cavity; when the groundwater in the slope body and the cavity is drained off, air enters the inlet of the drain pipe, suction and discharge action of the drain pipe disappears, and a first drainage process is terminated; a drainage process circulates with the circulation of the rainfall infiltration.

* * * * *